Patented Feb. 6, 1923.

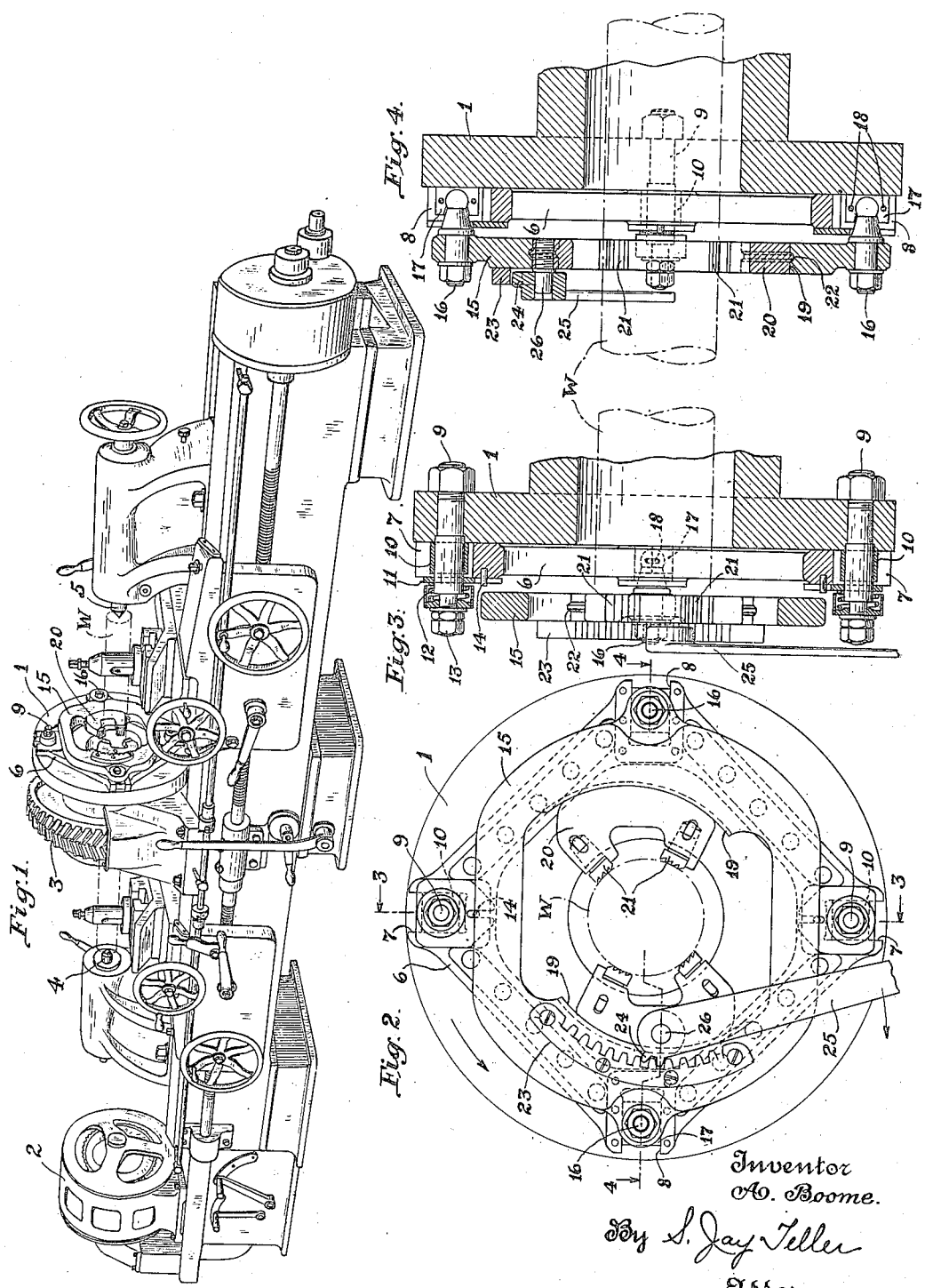

1,444,724

UNITED STATES PATENT OFFICE.

ALEXANDER BOOME, OF CHICAGO, ILLINOIS.

WORK DRIVER FOR LATHES.

Application filed November 15, 1920. Serial No. 424,008.

*To all whom it may concern:*

Be it known that I, ALEXANDER BOOME, a citizen of the United States, residing at Chicago, in the county of Cook and State of Illinois, have invented certain new and useful Improvements in Work Drivers for Lathes, of which the following is a specification.

This invention relates to work-driving lathe dogs and particularly to such a dog adapted to be floatingly mounted on a lathe face plate and to automatically grip the work when the face plate is rotated.

In turning heavy work, such as car wheels and axles, it is well known that considerable driving power is required, which power acting through the dog and its jaws to the work necessitates the use of a dog having the maximum strength and rigidity as well as one providing the greatest convenience and efficiency in operation. It is accordingly the primary object of this invention to provide a driving dog of the above type embodying these improved features.

More specifically, it is an object of the invention to provide a work-driving dog with a plurality of work-engaging jaws mounted therein in a most substantially and secure manner whereby the reactive thrust of work on the jaws is transferred directly to the dog in a manner substantially as though the jaws and dog were a one piece element.

Further and more specific objects of the invention will become apparent from the following specification taken in connection with the accompanying drawing wherein:

Figure 1 is a perspective view of an axle lathe embodying my invention.

Fig. 2 is a front elevation of the lathe face plate and the work-driving dog mounted thereon.

Fig. 3 is a sectional view of the same taken on the line 3—3 of Fig. 2.

Fig. 4 is a sectional view of the same taken on the line 4—4 of Fig. 2.

Referring in detail to the drawing, 1 illustrates the face plate of the lathe driven from the motor 2 through the face plate driving gear 3. The work W is adapted to be supported on the centers 4 and 5. Since the work is supported and held in true alignment on the centers, the driving dog must be mounted in a manner to readily adjust itself to the work and any irregularity therein. Such mounting of the dog is preferably provided through an equalizing plate or frame as illustrated in the drawing. This plate 6 is preferably in the form of a square frame as illustrated and is provided at diametrically opposite corners thereof with channels 7 and 8 forming guideways for floatingly supporting the work driving dog as will hereinafter appear. This frame 6 is mounted on the face plate by means of a pair of bolts 9 secured in the face plate at diametrically opposite sides of the axis thereof and having blocks 10 thereon accurately slidingly fitting the channel 7 in the frame 6. A cover plate 11 fits over each bolt 9 and is engaged by a spring 12 held under compression thereagainst by means of nuts 13. A pin 14 in the frame engages a slot in each plate 11 to prevent the plate from rotating. The spring 12 serves to hold the frame frictionally against the face plate to normally prevent sliding movement of the frame thereon.

The work driving dog 15 has mounted therein at diametrically opposite sides thereof a pair of bolts 16 each having an end thereof formed into a ball adapted to be received in a socket of a two-part block 17 slidably mounted in the channels 8 of the frame, the two parts of the block being secured together by means of a pair of pins 18. It will now be seen that through the channel connections at 7 and 8 the dog is floatingly mounted on the face plate in such a manner that it will readily adjust itself to the work W at all times.

As heretofore stated, one purpose of this invention is to provide a more substantial and secure mounting for the work-engaging jaws within the driving dog. As illustrated in the drawing, the dog is provided interiorly thereof with a plurality of guideways 19 arranged eccentrically around the central axis of the dog, two diametrically opposite guideways being illustrated. A work-engaging jaw 20 provided with a plurality of work-gripping teeth as 21 is adapted to be mounted on each guideway to engage the work as illustrated in Fig. 2. As will be noted, each jaw 20 has its rear face directly in contact throughout its entire surface with the interior surface of the dog, a tongue and groove connection 22 being preferably provided to hold each jaw properly positioned centrally within the dog. The width of each jaw is preferably substantially that of the dog whereby the jaws at no place project beyond the plane of either face of the dog. To permit the releasing of the jaws from engagement with the work, I provide a gear segment 23 on the dog adapted to be engaged by the teeth 24 of a wrench 25 adapted to fit over a pin or lug 26 on one of the jaws.

In operation the work is first placed through the dog 15 and mounted on the centers 4 and 5. The jaws 20 are then placed in position within the dog on the lower parts of the guideways and slid along the guideways, which being eccentric, soon move the teeth 21 into engagement with the work. The power is now turned on the machine and as the face plate 6 and dog 15 rotate in the direction of the arrow (Fig. 2), the dog is first moved relative to the jaws 20, due to the resistance of rotation offered by the work. When the resistance has been overcome the jaws have automatically become firmly engaged with the work and the greater the resistance offered by the work the greater will be the tightening grip of the jaws on the work. In releasing the jaws from work-engaging position, the wrench 25 is engaged with the lug 26 on one of the jaws and turned in the direction indicated by the arrow in Fig. 2 whereby the jaw is moved down its eccentric guideway and out of engagement with the work. Since the jaw is tightly engaged with the work the first movement of the wrench will operate to move both jaws and the work relative to the dog. Through this operation both jaws are moved down their eccentric guideways and are thereby released from engagement with the work and may be removed from within the dog.

What I claim is:

1. In a lathe, the combination of a face plate, a work-driving dog floatingly mounted thereon, the dog being provided internally with a plurality of eccentrically disposed guideways, a plurality of work-driving jaws mounted in the dog with their rear faces bearing against the guideways, and means for releasing the jaws from the work.

2. In a lathe, the combination of a face plate, a work-driving dog floatingly mounted thereon, the dog being provided internally with two diametrically opposite eccentrically disposed guideways, and a work-driving jaw comprising a plurality of detachable work-engaging teeth thereon mounted on each guideway with the rear face thereof bearing against the guideway.

3. In a lathe, the combination of a face plate, a work-driving dog floatingly mounted thereon, the dog being provided internally with a plurality of eccentrically disposed guideways, and a plurality of work-driving jaws mounted in the dog with their rear faces bearing against the guideways, each jaw and its respective guideways being provided with a tongue and groove connection for holding the jaw centrally disposed within the dog.

4. In a lathe, the combination of a face plate, an equalizing plate mounted on the face plate for sliding movement thereon in either direction in a straight line diametrically of the face plate, a work-driving dog mounted on the equalizing plate for sliding movement thereon in either direction in a straight line diametrically of the face plate at right angles to the sliding movement of the equalizing plate, the dog being provided internally with a plurality of eccentrically disposed guideways, a plurality of work-driving jaws mounted in the dog with their rear faces bearing against the guideways, and means for sliding one of the jaws along its guideway.

5. In a lathe, the combination of a face plate, a work-driving dog floatingly mounted thereon, the dog being provided internally with a plurality of eccentrically disposed guideways, a plurality of work-driving jaws mounted in the dog with their rear faces bearing against the guideways, the construction being such that the jaws will automatically grip the work when the face plate is rotated, and wrench-engaging means between one of the jaws and the dog for releasing the grip of the jaws on the work.

6. In a lathe, the combination of a face plate, a work-driving dog floating mounted thereon, the dog being provided internally with a plurality of eccentrically disposed guideways, a plurality of work-driving jaws mounted in the dog with their rear faces bearing against the guideways, the construction being such that the jaws will automatically grip the work when the face plate is rotated, and means comprising a gear sector on the dog and a lug on one of the jaws adapted to be engaged by a wrench for releasing the grip of the jaws on the work.

7. In a lathe, the combination of a face plate, a work-driving dog floatingly mounted thereon, the dog being provided internally with a plurality of eccentrically disposed guideways, and a plurality of removable work-driving jaws loosely mounted in the dog with their rear faces bearing against the guideways, the construction being such that the jaws are placed in work-driving position within the dog after the work has been positioned therein.

8. In a lathe, the combination of a face plate, a work-driving dog floatingly mounted thereon, the dog being provided internally with a plurality of eccentrically disposed guideways, and a plurality of work-driving jaws mounted in the dog with their rear faces bearing against the guideways, the body of each jaw being within the face planes of the dog.

9. In a lathe, the combination of a face plate, a work-driving dog floatingly mounted thereon, the dog being provided internally with a plurality of eccentrically disposed guideways, and a plurality of work-driving jaws mounted in the dog with their rear faces bearing against the guideways, the width of each jaw being substantially the width of the dog and each jaw being so mounted within the dog that the face planes of each jaw and those of the dog substantially coincide.

In testimony whereof, I hereto affix my signature.

ALEXANDER BOOME.